(12) United States Patent
Li et al.

(10) Patent No.: US 8,479,162 B2
(45) Date of Patent: Jul. 2, 2013

(54) METHOD AND APPARATUS FOR LOCATING MEMORY LEAK IN A PROGRAM

(75) Inventors: Ying Li, Beijing (CN); Tian Cheng Liu, Beijing (CN); Quan Long, Trumpington (GB); Jing Luo, Beijing (CN); Cheng Wei Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 12/511,122

(22) Filed: Jul. 29, 2009

(65) Prior Publication Data
US 2010/0031238 A1 Feb. 4, 2010

(30) Foreign Application Priority Data
Jul. 29, 2008 (CN) .......................... 2008 1 0144108

(51) Int. Cl.
*G06F 9/44* (2006.01)
(52) U.S. Cl.
USPC .......................................... 717/124; 717/131
(58) Field of Classification Search
USPC .................................................. 717/124–135
See application file for complete search history.

(56) References Cited

U.S. PATENT DOCUMENTS

| 5,689,707 A * | 11/1997 | Donnelly ............................. 1/1 |
| 2001/0013119 A1* | 8/2001 | Agarwal ......................... 717/11 |
| 2002/0073402 A1* | 6/2002 | Sangavarapu et al. ........ 717/129 |
| 2005/0071387 A1* | 3/2005 | Mitchell et al. ............... 707/201 |
| 2006/0190806 A1* | 8/2006 | Sasson et al. ................. 715/500 |
| 2007/0288899 A1* | 12/2007 | Fanning et al. ............... 717/124 |
| 2008/0072007 A1* | 3/2008 | Zagatta ......................... 711/170 |
| 2008/0148242 A1* | 6/2008 | Cobb et al. ................... 717/130 |
| 2008/0294936 A1* | 11/2008 | Hogstrom et al. ................. 714/8 |
| 2008/0320449 A1* | 12/2008 | Hwang .......................... 717/127 |
| 2009/0037687 A1* | 2/2009 | Li et al. ......................... 711/173 |
| 2009/0100415 A1* | 4/2009 | Dor et al. ...................... 717/131 |
| 2009/0210854 A1* | 8/2009 | Carteri et al. ................. 717/102 |
| 2009/0228870 A1* | 9/2009 | Kao et al. ...................... 717/127 |
| 2010/0269095 A1* | 10/2010 | King et al. .................... 717/111 |

FOREIGN PATENT DOCUMENTS

JP 2002278801 A 9/2002

OTHER PUBLICATIONS

Wu Min, et al., "Dynamic Trace Analysis on Memory Leak", China Academic Journal Electronic Publishing House, pp. 18-20, Feb. 1, 2006.
Dana Brand, Integration of Runtime Profiling and Static Code Analysis in Linux, Dec. 2006, University of British Columbia.
Michael D. Ernst, Static and dynamic analysis: synergy and duality, ICSE Workshop on Dynamic Analysis (WODA), Portland, Oregon, USA, May 2003.

\* cited by examiner

*Primary Examiner* — Anna Deng
(74) *Attorney, Agent, or Firm* — Cantor Colburn LLP; Dwayne Nelson

(57) ABSTRACT

A method and apparatus for locating a memory leak in a program code by a computer device using a combination of dynamic analysis and static analysis approaches. The method includes dynamically analyzing the program to determine a memory leak characteristic; filtering out items which do not match the determined memory leak characteristic of the program to reduce a static analysis range to certain suspicious parts of a source code; and statically analyzing the suspicious parts of the program to locate the memory leak in the program. The apparatus includes a dynamic analyzer device to determine memory leak characteristics; and a static analyzer device to filter out items which do not match the determined memory leak characteristic to reduce a static analysis range to certain suspicious parts of a source code and locate the memory leak in the program.

12 Claims, 13 Drawing Sheets

```
public class Leak {
        public static Vector list = new Vector();
        public static void main() {
                Leak l = new Leak ();
                for (int i=0;i<10;i++)
                        l.process(list, i);
        }
        public void process(Vector v, int num) {
                String str = new String("Current time:"
                        + System. currentTimeMillis());
                if (num % 2 = = 0) {
                        System.out.println(str);
                        v.add(str);
                } else {
                        System.out.println(str);
                }
        }
}
```

Fig. 2B

| | |
|---|---|
| 1 | 2 |
| 2 | 3 |
| 3 | 4 |
| 4 | 5 |
| 5 | 6 |
| 6 | 4 |
| 6 | NULL |
| 4 | NULL |

CallerHitSet

CurrentHitSet

Fig. 2D

| | |
|---|---|
| 7 | 8 |
| 8 | 9 |
| 9 | 10 |
| 10 | 11 |
| 11 | 12 |
| 12 | 13 |
| 13 | NULL |
| 11 | 14 |
| 14 | NULL |

CallerHitSet

CurrentHitSet

Fig. 2E

CallerHitSet

CurrentHitSet

| 7, SSANew(String) |

CallerHitSet

CurrentHitSet

| 7, str, SSANew(String) |
| 9. tmp, SSAPut (string+current..) |
| 13. v->str, SSAInvoke(v.add) |

METHOD AND APPARATUS FOR LOCATING MEMORY LEAK IN A PROGRAM

CROSS-REFERENCE TO RELATED APPLICATIONS

This application claims priority under 35 U.S.C. §119 from Chinese Patent Application No. 200810144108.2, filed Jul. 29, 2008, the entire contents of which are incorporated herein by reference.

FIELD OF THE INVENTION

The present invention generally relates to a method and apparatus for locating a memory leak in a program. More specifically, the present invention relates to a method and apparatus for locating a memory leak in a program by the use of a combination of dynamic analysis and static analysis.

BACKGROUND OF THE INVENTION

A memory leak is a major threat to reliability which is a key indication of software system quality. The memory leak can degrade system performance and even result in system failure when serious.

Memory space required by many variables cannot be determined in compiling the software. Therefore, the operating system is configured to allocate memory dynamically to these variables at runtime. Accordingly, many programming languages have their own memory management mechanisms so that the memory is allocated for a variable when being created and reclaimed when the variable no longer needs the memory.

Inappropriate programming in a program may lead to memory leak which exhibits differently among various kinds of programs. For instance, in a C/C++ program, a memory leak means the dynamically allocated memory is unrelieved or cannot be relieved for some reason which results in waste of system memory. While in a Java program, reclamation of memory is automatically managed by GC (Garbage Collection) without the need of the programmer relieving memory through explicit operations. However, there exists the possibility of a memory leak in a Java program since GC can only reclaim the memory spaces used by the objects which are not referenced by other objects. This means when a program inadvertently maintains references to objects that it no longer needs then the garbage collector is prevented from reclaiming space which results in a memory leak.

For example, in a Java program, objects are requested circularly and the requested objects are put into a vector. When an object is being relieved, i.e. the object is set to null, an object exhibits un-collectable by GC since the vector still refers to the object. Therefore, an object must be removed from the vector if the object is put into the vector. The simplest way is to remove the object from vector using a remove method but is not always done. This is a major reason for which memory leak occurs in a Java program.

As another example, Class Logger has a static variable temp of Class HashMap. Every time Logger.log(message) is executed, the value of the message is written into temp (with keys of current thread+current time), and then items with keys of a current thread and a current time are removed from temp before exit. It is noted that the current time here is varying, so the deletion of items before the exit of the method log cannot remove the initially written items. Thus, any character string transferred to the log as a parameter is referenced by the static variable temp of Logger so that this string cannot be garbage collected. Keeping such object reference creates a Java memory leak.

A major reason for memory leak in a Java program is retaining these no longer used object references. In simple, inappropriate programming leads to the presence of a reference chain which should be absent. As such objects referred to cannot be reclaimed. Hence for a Java program, the objective of memory leak analysis is to find out these useless reference chains and reason they were formed.

In prior memory leak analysis of a program, there are two types of solutions (1) static analysis methods and (2) dynamic analysis methods. Dynamic analysis methods find memory leak problems by profiling the memory or stack activity at runtime. However for a Java program, dynamic analysis methods such as LeakBot, described in "An Automated and Lightweight Tool for Diagnosing Memory Leaks in Large Java Applications", Nick Mitchell, and Gary Sevitsky, European Conference on Object-oriented Computing (ECOOP), July 2003, cannot directly link memory leaks to Java source code and requires developers' extra efforts to identify the locations in the source code. Static analysis methods use program analysis technologies to analyze the source code. For example refer to the memory analysis methods disclosed in "Automatic removal of array memory leaks in Java", R. Shaham et al., In D. A. Watt, editor, Compiler Construction, 9th International Conference, volume 1781 of Lecture Notes in Computer Science, pages 50-66, Berlin, Germany, March 2000, Springer and "Low-overhead memory leak detection using adaptive statistical profiling", T Chilimbi, and M. Hauswirth, In Proceedings of the Symposium on Architectural Support for Programming Languages and Operating Systems (ASPLOS), October 2004. However, such static analysis methods have high computation overhead which results in a long time to locate memory leak items.

In Micheal D. Ernstan's article titled "Static and dynamic analysis: synergy and duality", ICSE Workshop on Dynamic Analysis (WODA), Portland, Oreg., USA, May 2003, an idea of combining dynamic analysis method and static analysis method to analyze software was proposed. However, there is no concrete solution to the analysis problem.

Therefore, it is desirable to provide a method and apparatus capable of locating memory leak items accurately in a short time.

SUMMARY OF THE INVENTION

An object of the present invention is to provide a method and apparatus for detecting a memory leak in a program. The method and apparatus of the present invention eliminate or partially eliminate such problems existing in the prior art.

The present invention is directed to a specific method and apparatus for locating a memory leak in a program source code using a combination of dynamic analysis and static analysis. Specifically, the method and apparatus of the present invention retrieve dynamic information by existing dynamic analysis methods, reduce static analysis range to certain suspicious parts of the source code, and then locate memory leak by static analysis of the suspicious parts.

In a first aspect of the present invention, a method for locating a memory leak in a program by a computer device is provided. The method includes the steps of dynamically analyzing the program by a computer device to determine a memory leak characteristic; filtering out items which do not match the determined memory leak characteristic of the program by a computer device in order to reduce a static analysis range to certain suspicious parts of a source code of the program; and statically analyzing the suspicious parts of the program by a computer device to locate the memory leak in the program.

In a second aspect of the present invention, a method is provided for locating a memory leak in a program by a computer device, which includes the steps of: dividing the program by a computer device into a plurality of segments; selecting by a computer device a dynamic analysis method for each of the plurality of segments; dynamically analyzing by a computer device each of the segments using the selected dynamic analysis method to determine a memory leak characteristic for each of the segments; and statically analyzing each of the segments by a computer device based on the determined corresponding memory leak characteristic to locate a memory leak in each of the segments of the program.

In a third aspect of the present invention, an apparatus for locating a memory leak in a program includes: a dynamic analyzer device configured to dynamically analyze the program to determine memory leak characteristics; and a static analyzer device configured to filter out items which do not match the determined memory leak characteristic of the program in order to reduce a static analysis range to certain suspicious parts of a source code of the program and statically analyze the suspicious parts of the program to locate the memory leak in the program.

Compared to the static analysis method and the dynamic analysis method in the prior art, the method and the apparatus of the present invention both help in locating the memory leak in the source code and reduce analysis time.

BRIEF DESCRIPTION OF THE DRAWINGS

The above and the other features of the present invention will be understood better from the following detailed description of exemplified embodiments of the present invention with reference to the accompanying drawings.

FIGS. 2B-2J illustrates the static analysis shown in FIG. 2 in an example way;

DETAILED DESCRIPTION OF THE PREFERRED EMBODIMENTS

Figure 1:
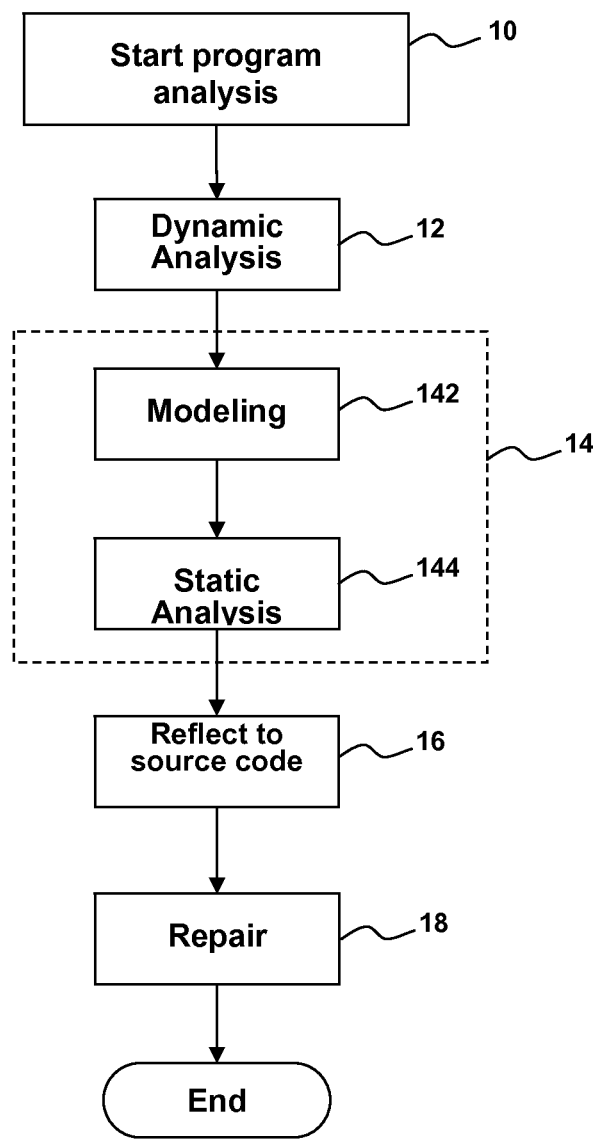
FIG. 1 is a general flowchart showing a method for locating memory leak according to a preferred embodiment of the present invention.

It is to be understood that the drawings included herewith only provide diagrammatic representations of the presently preferred structures of the present invention and that structures falling within the scope of the present invention may include structures different than those shown in the drawings. Hereinafter, preferred embodiments of the present invention are explained taking Java program as an example. Reference will now be made to the drawings wherein like structures are provided with like reference designations.

FIG. 1 is a general flowchart showing a method for locating a memory leak according to a preferred embodiment of the present invention. As shown in FIG. 1, a program analysis starts at Step 10 after Class files of a Java program are obtained. Next, at Step 12, the Java program is dynamically analyzed for a memory leak. The above dynamic analysis can be performed by any suitable one of existing dynamic analysis tools, such as HeapRoot™, HeapAnalyzer™, Jinsight™, LeakBot™ available from International Business Machine Inc., as well as JRockit™, JProfiler™ and Servertrace™. During dynamic analysis, the program to be analyzed or a part thereof is run. Hence, the dynamic analysis is performed at runtime. Dynamic analysis information is obtained through Step 12 to locate characteristics resulting in a memory leak in Java program, for example, reference path information such as "Vector→String".

Next, at Step 142, the program to be analyzed is modeled statically. In the embodiment of the present invention, the program to be analyzed is modeled using Call Graph and Static Single Assignment (SSA). Specifically, at first, a call graph of methods contained in the program is established in a unit of method. Then, an internal relationship among methods using four basic block, SSANew, SSAPut, SSAGet and SSA-Invoke, which denote creating, assigning, getting and invoking other methods respectively, as well as logic relationship therebetween. Of course, those skilled in the art will recognize that any other suitable static modeling is possible, such as WALA™ analysis tool available from IBM, and modeling as described in "Practical Improvements to the Construction and Destruction of Static Single Assignment Form", BRIGGS et al., SOFTWARE PRACTICE AND EXPERIENCE, VOL. 28 (8), 1-28, July 1998.

Next, the method proceeds to Step 144 of performing memory leak static analysis to the static model established at Step 142 based on the dynamic analysis information obtained at Step 12 so as to locate a memory leak in the Java Class file. The static analysis based on dynamic analysis information at Step 144 will be explained in detail later in the description with reference to FIG. 2A.

At Step 16, after locating statements and related variables or objects resulting in the memory leak through static analysis at Step 144, the entire of Class file is last-visited to locate last used variables or objects resulting in the memory leak. The located memory leak is reflected to Java source code by the use of mapping between Java Class file and Java source code. Then, the code corresponding to memory leak location of Class file is located in the Java source code. At Step 18 the correct coding may be provided to the user, or the code corresponding to memory leak location may be repaired automatically.

Those skilled in the art will appreciate that the foregoing description is only illustrative and other ways may be contemplated. Alternatively, for example, Step 12 of dynamic analysis and Step 142 of static modeling may be performed simultaneously. Another possibility is the step of static modeling is performed first and then step of dynamic analysis is performed.

Figure 2A:
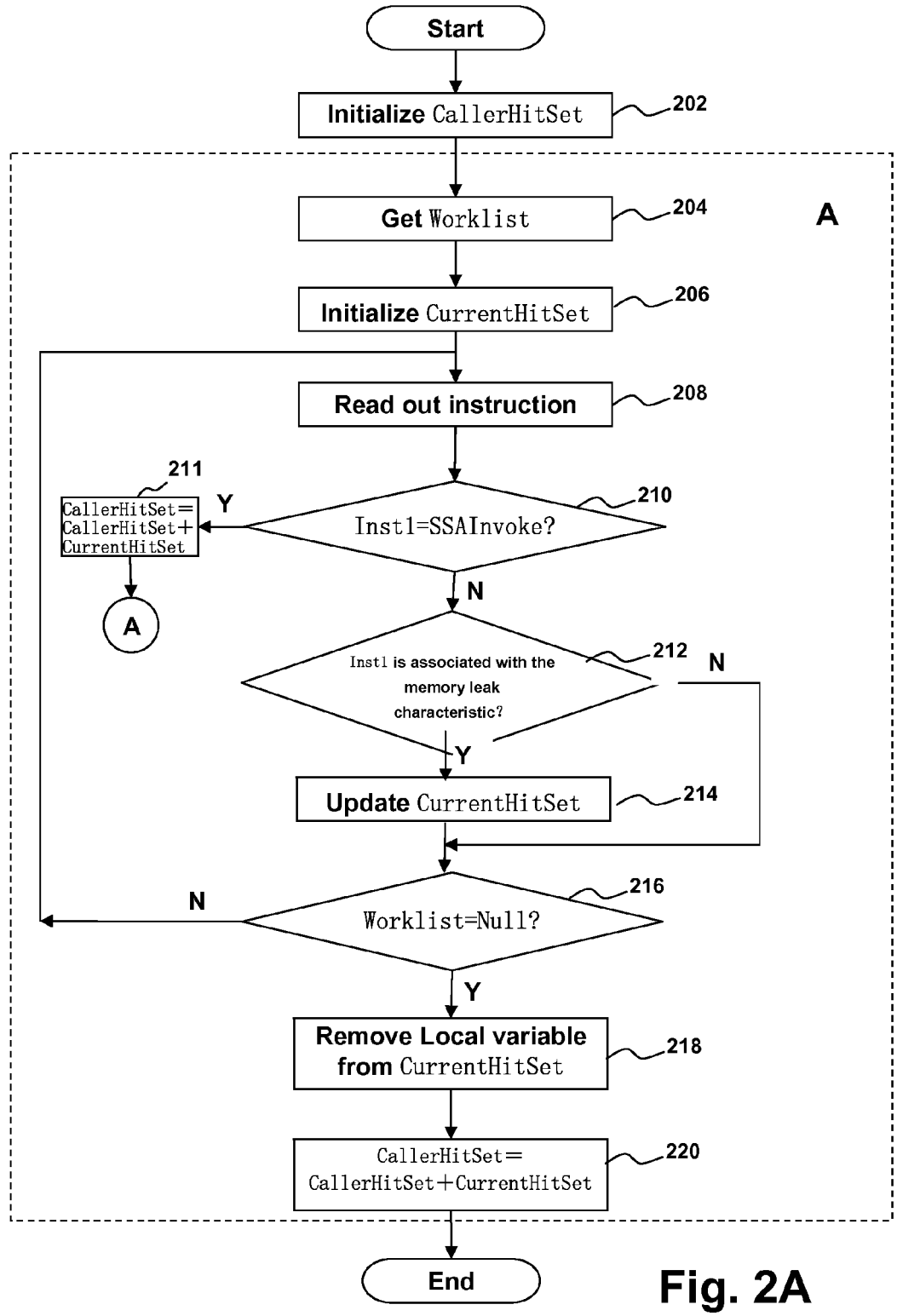
FIG. 2A is a flowchart showing static analysis according to the preferred embodiment of the present invention.

FIG. 2A is a flowchart showing static analysis according to a preferred embodiment of the present invention. In this embodiment, two variables CallerHitSet and CurrentHitSet for storing memory leak related information are set. CallerHitSet is used to store global memory leak related information and CurrentHitSet is used to store the memory leak related information of a method under analysis. In case there is no method invocation in the program under analysis, only one variable HitSet may be used to store memory leak information. At first, at Step 202, the variable CallerHitSet is initialized as Null. Next, at Step 204, a variable Worklist for storing instructions of the program to be analyzed is retrieved. In this embodiment, Worklist stores modeled instructions in pair form, i.e. <Inst1, Inst2>, where Inst1 is the instruction under analysis and Inst2 is the next instruction to be analyzed. Such pair form of storing instruction ensures accuracy of a reading instruction. Those skilled in the art will appreciate that Worklist with any other forms suitable for storing instructions is possible instead of being limited to the precise form disclosed in the present invention.

Then the method proceeds to Step 206 where the variable CurrentHitSet is initialized. Every time a method is analyzed, CurrentHitSet will be reset at Null so as to only store memory leak items present in the method under analysis.

At Step 208, instruction pairs are read piecewise from Worklist obtained at Step 204. In this embodiment, only the first instruction Inst1 of the read instruction pair <Inst1, Inst2> is analyzed for a memory leak. At Step 210, it is judged whether Inst1 is a method invocation block SSAInvoke. If Inst1 is judged for example to be SSAPut, SSANew or SSAGet, other than SSAInvoke, then the method proceeds to Step 212.

At Step 212, it is judged whether Inst1 is associated with the memory leak characteristic obtained by dynamic analysis at Step 12 of FIG. 1. If Inst1 is judged as not being associated with the memory leak characteristic, then the analysis method jumps to Step 216. If Inst1 is judged as being associated with the memory leak characteristic, then the location of Inst1 is stored into the variable CurrentHitSet at Step 214 and then the method proceeds to Step 216.

At Step 216, it is judged whether all instruction pairs contained in Worklist have been read out. If there are still instruction pairs to be read out and analyzed in Worklist, then the method jumps to Step 208 where a new instruction pair is read out and the read instruction pair is analyzed through Step 210-214. When it is judged that all instruction pairs in Worklist have been read out and analyzed at Step 216, i.e. when the Worklist is Null, the method proceeds to Step 218.

At Step 218, the local variables stored into CurrentHitSet are removed and only the instructions (or leak chains) that match the memory leak characteristic obtained by dynamic analysis remain. Subsequently at Step 220, a merging operation from CurrentHitSet to CallerHitSet is performed, i.e. CallerHitSet=CallerHitSet+CurrentHitSet. At this time, what is stored in CallerHitSet are all of memory leak variables or instructions obtained by use of this analysis method.

Return to Step 210, if at Step 210 it is judged that Inst1 belongs to SSAInvoke, a method invocation block SSAInvoke(process), a merging operation Step 211 where CallerHitSet=CallerHitSet+CurrentHitSet is performed at first and then the invoked method is further analyzed to determine which statement(s) in the invoked process would result in the memory leak. The procedure of analyzing memory leak in an invoked method, represented in FIG. 2A as 'A', is identical to the procedure of main analysis method, that is to say, Step 204-220 in FIG. 2A performed recursively. Specifically, at first Worklist_process storing all instructions in the invoked method is obtained, then CurrentHitSet is set at Null. Next, as in the main method, the instruction pairs of the invoked method are read out piecewise from Worklist_process. Then, the read instructions are judged whether or not they are associated with the memory leak characteristic obtained by dynamic analysis. The instructions which are associated with the memory leak characteristic are stored in CurrentHitSet. CurrentHitSet is merged into CallerHitSet after analyzing all instruction pairs stored in Worklist_process, and then procedure returns back to the main method with CallerHitSet containing memory leak items in the invoked method. It is noted that when the invoked method further invokes other methods, Step 204-220 in FIG. 2A may be further recursively performed.

The main method is the only entrance and exit of a Java program. Therefore, information stored in CallerHitSet after the analysis of main method at Step 220 is completed is the desired memory leak information.

Figure 2C:
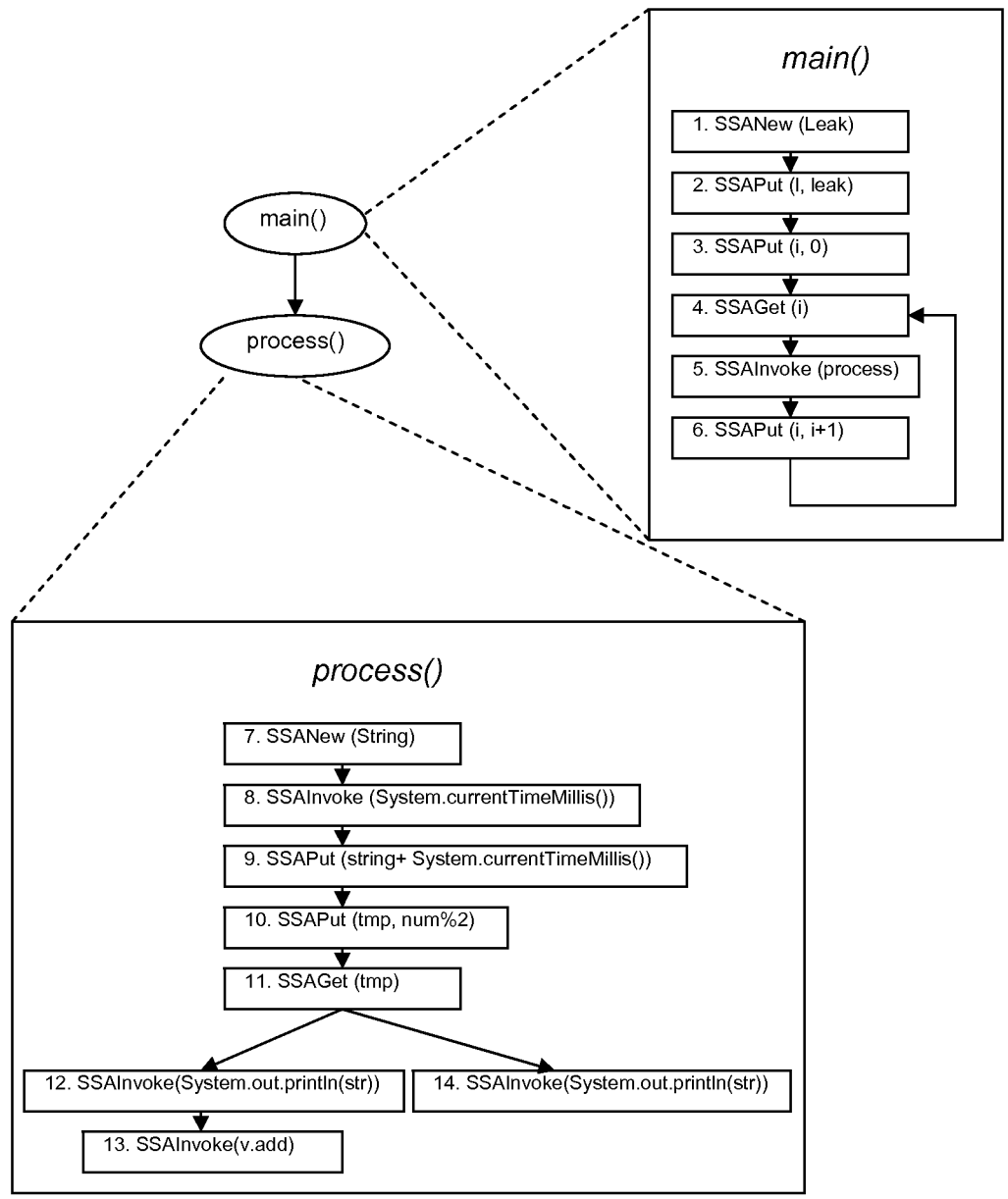

Now the static analysis in FIG. 2A will be explained taking an actual Java program as example. FIG. 2B shows a portion of Java program to be analyzed. Assume that the memory leak characteristic obtained after dynamically analyzing the portion of Java program at Step 12 is "Vector→String". The model built at Step 142 of static modeling is shown in FIG. 2C. Further, Worklist with respect to the main routine main( ) obtained at Step 204 is shown as FIG. 2D. CallerHitSet and CurrentHitSet are set at Null at Steps 202 and 206, respectively.

Next, a first instruction pair <1, 2> is obtained at Step 208, wherein only a first instruction SSANew(Leak) is to be analyzed. This instruction is a kind of SSANew, therefore the procedure proceeds to Step 212 via judgment at Step 210. At Step 212, it is determined that this instruction SSANew (Leak) is not associated with the dynamic analysis result "Vector→String", thus at this time CallerHitSet and CurrentHitSet still keep Null. Then, the procedure jumps to Step 208 where next instruction pair <2, 3> is read after judging whether Worklist is Null at Step 216. It is determined that the instruction 2. SSAPut(I, leak) is not kind of SSAInvoke and further not associated with memory leak characteristic obtained by dynamic analysis. Thus, CallerHitSet and CurrentHitSet still keep Null. Similarly, the instruction pairs <3, 4> and <4, 5> are read out and analyzed with no statement satisfying the characteristic "Vector→String".

Next, the instruction pair <5, 6> is read out and the first instruction SSAInvoke(process) is judged to be kind of SSAInvoke at Step 210, thus the invoked method is analyzed by recursively performing Step 204-220. As shown in FIG. 2E, Worklist_process is obtained based on the model of process in FIG. 2C and then CurrentHitSet is set at Null. In addition, since there is no instruction matching the memory leak characteristic obtained by dynamic analysis before analyzing the process method, then CallerHitSet is also Null.

Figure 2F:
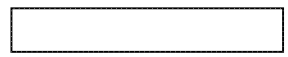
Figure 2G:
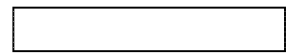

Step 208 is recursively performed to obtain first instruction pair <7, 8> in the process subroutine. Because the instruction SSANew(String) is not a kind of SSAInvoke and is associated with the dynamic analysis characteristic "Vector→String", at Step 214, this instruction location is written into CurrentHitSet. At this time CallerHitSet and CurrentHitSet are shown as in FIG. 2F. Then, the next instruction pair <8, 9> is read out from Worklist_process. It is noted that the instruction SSAInvoke(System.currentTimeMillis( )) is a kind of invoking process, thus the analysis procedure with respect to the process subroutine is paused while Steps 204-220 in FIG. 2A are recursively performed with respect to System.currentTimeMillis( ). In this example, assume that it is known that there is no instruction matching the characteristic "Vector→String" in the subroutine System.currentTimeMillis( ), thus the description of analysis procedure with respect to System.currentTimeMillis( ) is omitted for simplicity and the analysis to the process subroutine is continued. Similarly, the instruction pairs <9, 10>, <10, 11>, <11, 12>, <12, 13>, <13, NULL>, and <14, NULL> are read out piecewise and analyzed. If it is determined that Worklist_process is Null when performing Step 216 recursively, then CallerHitSet and CurrentHitSet are as shown in FIG. 2G with CurrentHitSet storing three characteristic-related instructions 7, 9 and 13.

Figure 2H:
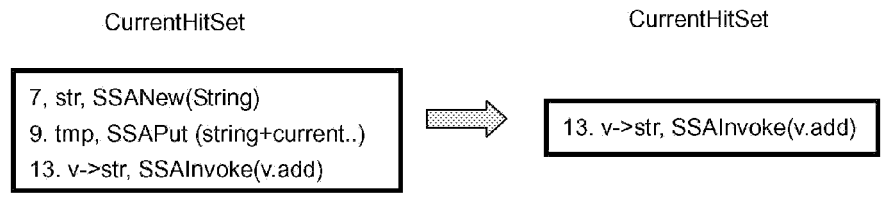
Figure 2I:
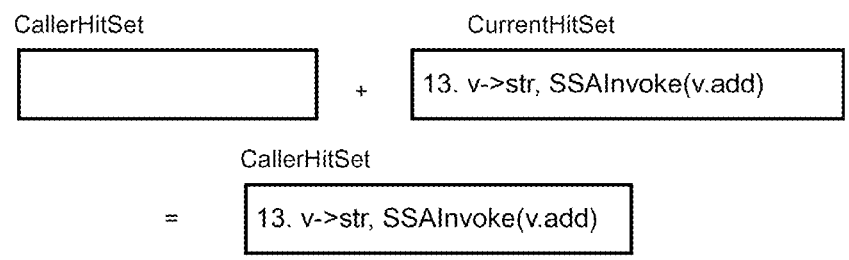

Next, Step 218 is performed to remove local variables in CurrentHitSet which are only associated with the dynamic analysis characteristic but do not perfectly match the characteristic. In this example, only the instruction 13 is remained in CurrentHitSet, as shown in FIG. 2H. Then, Step 220 is performed to merge CurrentHitSet into CallerHitSet, as shown in FIG. 2I.

Figure 2J:
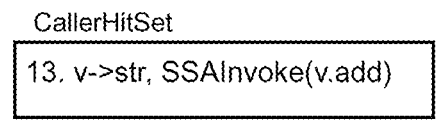

Now, the procedure returns to the analysis of the main routine, main( ), to continue reading out the subsequent instruction pair <5, 6>, <6, 4>, <4, NULL>, <6, NULL>. If any one of instructions matches the dynamic analysis characteristic then it is written into CurrentHitSet. In this example, those instructions are assumed not to match the dynamic analysis characteristic, thus leaving only one memory leak item v→str,SSAInvoke(v.add) remaining in CallerHitSet through removing and merging operations at Steps 218 and 220, as shown in FIG. 2J. Finally, the whole static analysis based on the dynamic analysis characteristic terminates.

Figure 3:
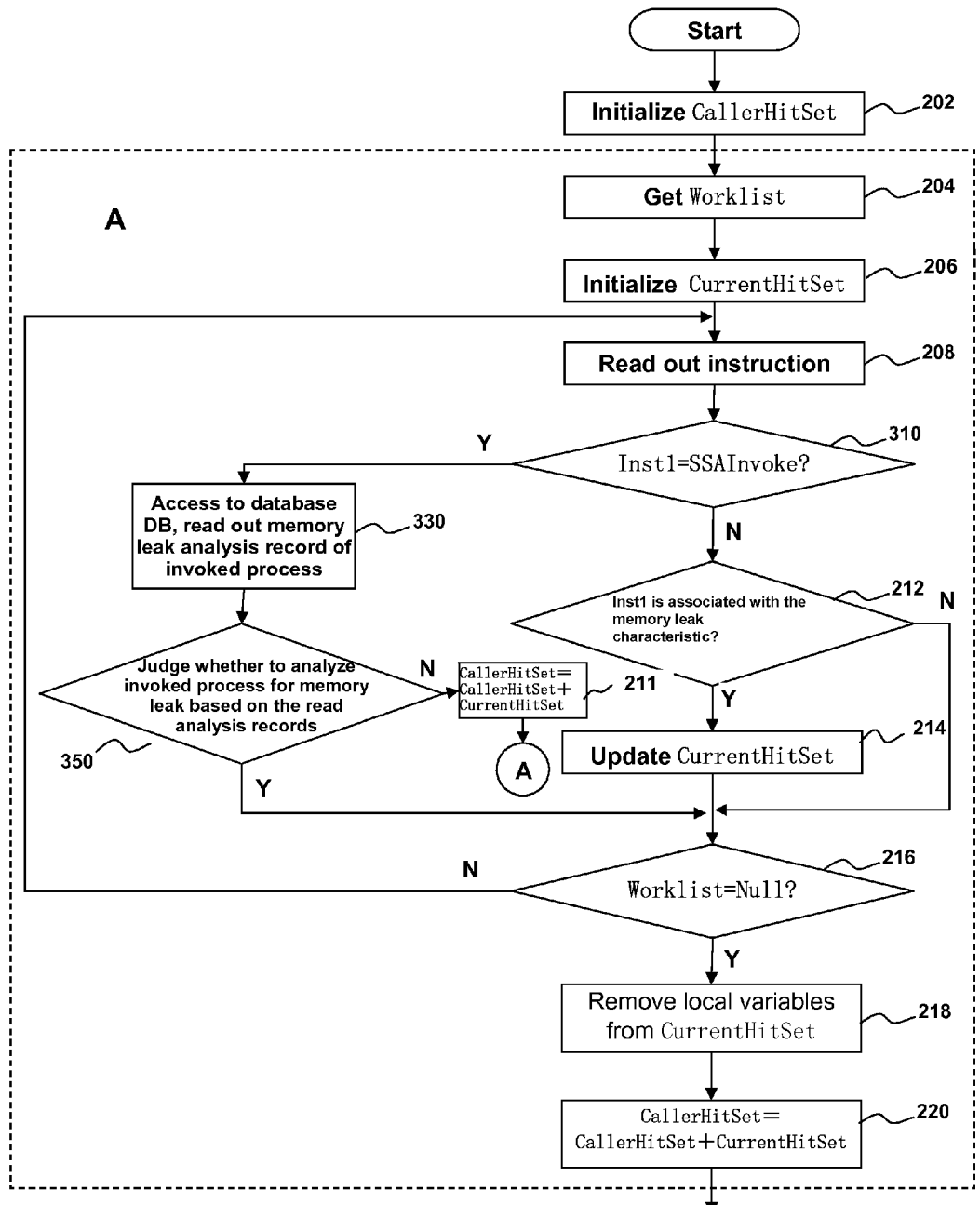
FIG. 3 is a flowchart showing static analysis according to another preferred embodiment of the present invention.

FIG. 3 is a flowchart showing static analysis according to another preferred embodiment of the present invention. This embodiment is identical with the one shown in FIG. 2A except an additional step for searching a database to determine whether the invoked process had been analyzed for memory leak. Here, the steps which are the same as the ones in FIG. 2A are omitted from detailed description and only the different steps from ones in FIG. 2A are explained.

Specifically, a database, DB, is provided in the system for storing and managing memory leak analysis records of various methods invoked in a program. The records of each of method may include previous memory leak analysis time, information on presence or absence of memory leak items, information on whether memory leak items have been removed, or the like. After Inst1 is determined to be SSAInvoke at Step 310, the analysis procedure may access to the database DB at Step 330 to read memory leak analysis record of the invoked method in Inst1.

At Step 350, it is determined whether to statically analyze the invoked method based on the read analysis record. Such determination may be based on, for example, elapsed time since last-time memory leak analysis, information on whether previously located memory leak items have been removed, relevance to a memory leak characteristic currently obtained by dynamic analysis method, and the like. Those skilled in the art will recognize that any other suitable determination rule is possible.

If it is determined that there is no need to analyze the invoked method at Step 350, the procedure jumps to Step 216. If it is determined that the invoked method is to be analyzed, Steps 204-220 are performed recursively.

Figure 4:
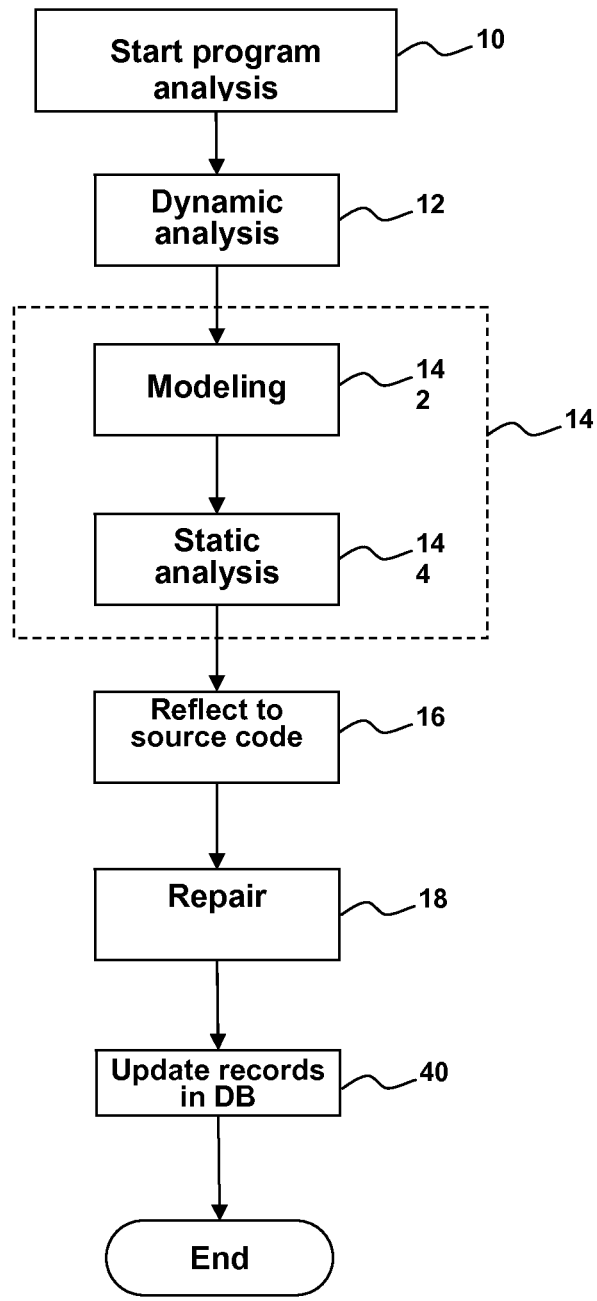
FIG. 4 is a general flowchart showing a method for locating memory leak according to another preferred embodiment of the present invention.

In this embodiment, as shown in FIG. 4, Step 40 is added after repairing the program at Step 18. At Step 40, the memory leak record of the invoked method in the database DB is updated. For example, the invoked method analyzed this time, memory leak characteristic used in analysis, information on whether memory leak items are repaired, analysis date, or the like are stored into the database DB as being associated with each other. Of course, those skilled in the art will appreciate that an update of memory leak records of the method in the database DB may be performed immediately after Step 218.

The embodiment shown in FIGS. 3 and 4 avoids repeated analysis of the same invoked methods. The embodiment shown in FIG. 3 is particularly advantageous when a method is invoked frequently and analysis of a method takes long time. Therefore, the embodiment is useful in saving memory leak analysis overhead and improving analysis speed.

Figure 5:
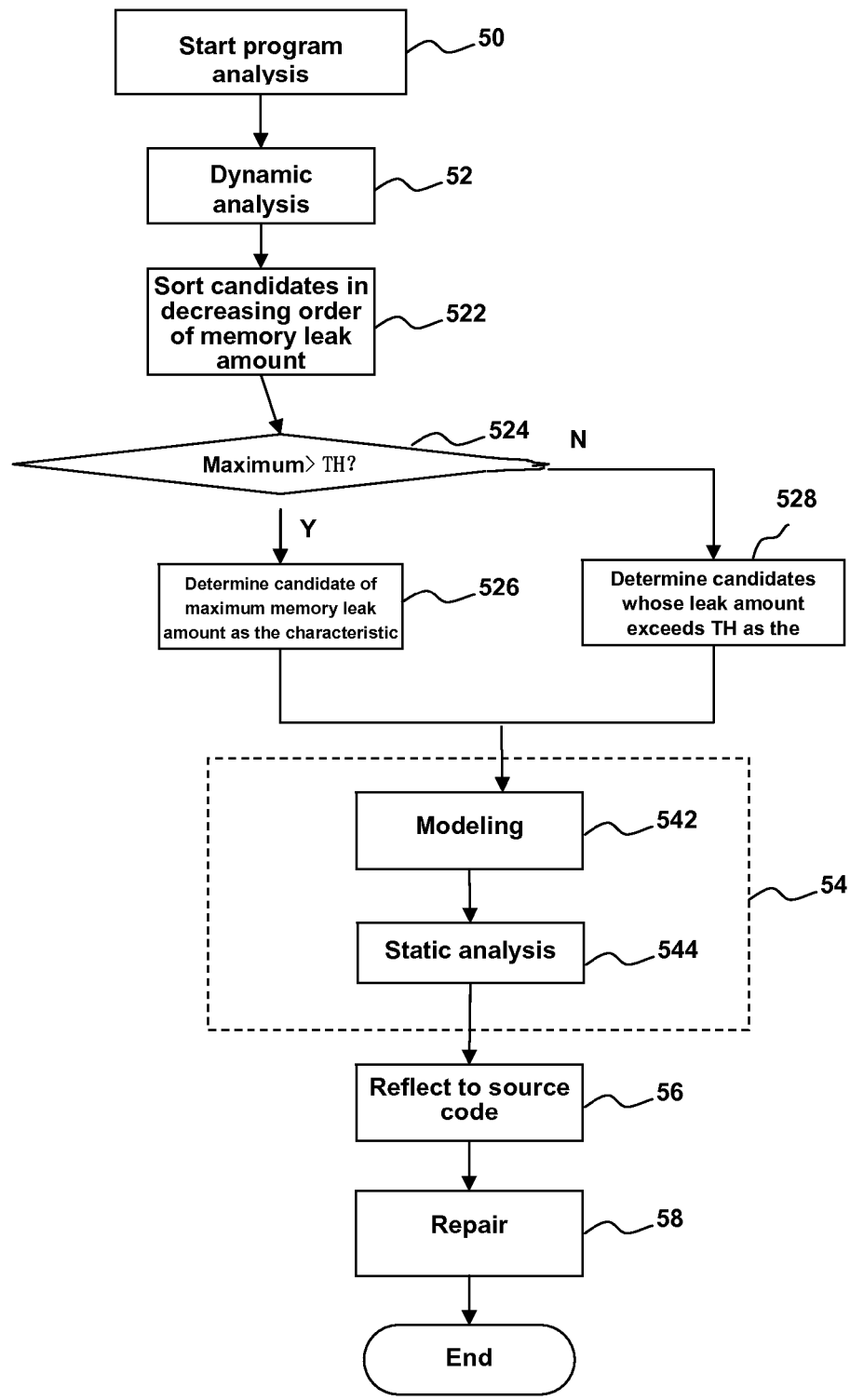
FIG. 5 is a flowchart showing a method for locating memory leak according to also another preferred embodiment of the present invention.

FIG. 5 is a flowchart showing a method for locating a memory leak according to another embodiment of the present invention. The embodiment shown in FIG. 5 is a variant of the one shown in FIG. 1 with an additional step for selecting and determining a memory leak characteristic after the step for dynamically analyzing the program (Step 52) and before the step for statically analyzing (Step 54).

As shown, a threshold TH for defining an acceptable memory leak amount is preset by the user. Here, the threshold TH may be any value set by the user as needed. At Step 522, a plurality of candidate memory leak characteristics are obtained by dynamic analysis. At Step 52 the candidates are sorted in decreasing order of memory leak amount. Then, the maximum memory leak amount is compared with the threshold TH at Step 524. If the maximum memory leak amount is larger than the threshold, then the candidate corresponding to this maximum memory leak amount is selected as the memory leak characteristic to be used in subsequent static analysis (Step 526). Whereas, if the maximum memory leak amount does not exceed the preset threshold, then several memory leak amounts sorted ahead are summed until the sum exceeds the preset threshold TH. The candidate memory leak characteristics whose leak amounts in total exceed the preset threshold TH are selected as the memory leak characteristics (Step 528). The program is analyzed with regards to those memory leak characteristics individually in subsequent static analysis. In the present embodiment, Step 54 of static analysis may employ the procedures shown in FIG. 2A or FIG. 3 or any other suitable static analysis procedures well-known in the art.

The above step for selecting and determining memory leak characteristic is only illustrative, and those skilled in the art will recognize that any other suitable determination is possible. For example, several dynamic analysis tools may be used to analyze the program so as to obtain a plurality of candidate memory leak characteristics. Certain one or ones of the plurality of candidate memory leak characteristics are determined as the memory leak characteristic(s) in consideration of speed and accuracy in combination. Moreover, for example, the program may be divided into a plurality of segments in accordance with nature of the program per se and a dynamic analysis method is selected for each of the plurality of segments. Each of the segments is dynamically analyzed by a corresponding dynamic analysis method to determine a dynamic analysis characteristic for each of the segments and each of the segments is statically analyzed based on the determined corresponding memory leak characteristic so as to locate memory leak in each of segments.

Figure 6:
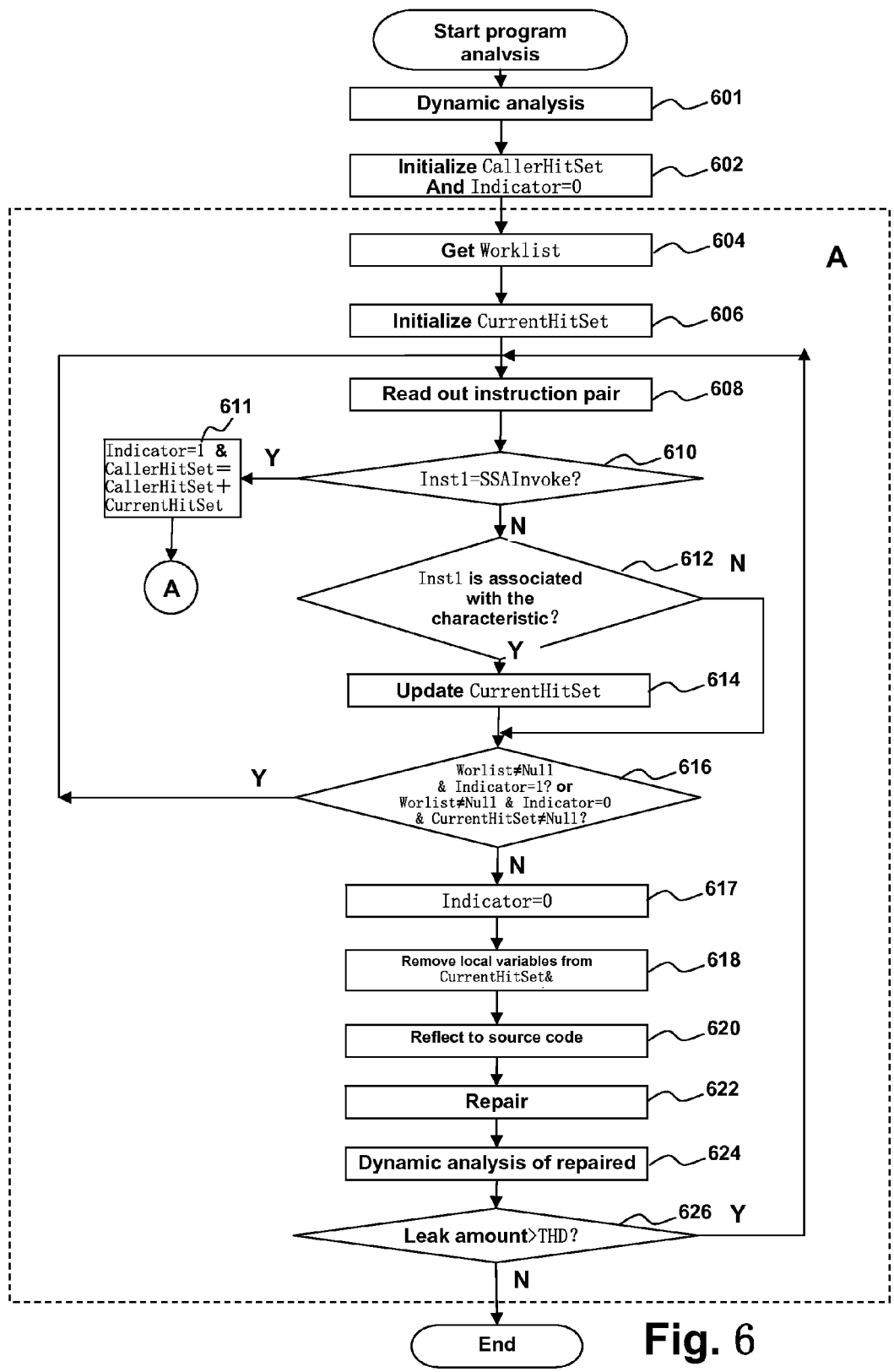
FIG. 6 is a flowchart showing a method for locating memory leak according to yet another preferred embodiment of the present invention.

FIG. 6 is a flowchart showing a method for locating a memory leak according to yet another preferred embodiment of the present invention. In the embodiment shown in FIG. 6, similar to the one shown in FIG. 5, a threshold, THD, for defining an acceptable memory leak amount is preset by the user. Here, the threshold THD may be any value set by the user as needed. First, the whole program is dynamically analyzed. Then, static analysis based on the obtained memory leak characteristics is performed but not through the whole program as shown in the embodiment shown in FIGS. 1 and 2. In this embodiment, a static analysis is performed until an item matching the memory leak characteristic obtained by dynamic analysis. Once such an item is located, the static analysis is paused to repair the memory leak item in source code. Then, dynamic analysis is directed to the repaired program. If memory leak amount at this time has been smaller than the threshold THD preset by the user, then the remaining portion of the program remains unanalyzed.

Hereinafter, the steps of embodiment shown in FIG. 6 which are identical with ones in FIGS. 1 and 2A are omitted for detailed description. In this embodiment, a variable, Indicator, is set to indicate whether the invoked method has been ended. The program analysis starts at Step 600. At first, the whole program is dynamically analyzed (Step 601), CallerHitSet is initialized and the variable Indicator is set at 0 (Step 602). The Worklist storing instruction pairs of the program is obtained (Step 604), and CurrentHitSet is initialized (Step 606).

Next, an instruction pair is read out from Worklist (Step 608), and it is judged whether the first instruction Inst 1 thereof is a kind of SSAInvoke (Step 610). If Inst1 is a kind of SSAInvoke, a merging operation CallerHitSet=CallerHitSet+CurrentHitSet is performed and Indicator is set at 1 (Step 611). Static analysis from Step 604 is recursively performed like in the embodiment shown in FIG. 2A. If Inst1 is not a kind of method invocation statement, then it is judged whether inst1 is associated with the memory leak characteristic obtained by the dynamic analysis at Step 601 (Step 612). If it is determined that Inst1 is associated with the memory leak characteristic at Step 612, then Inst1 is written into CurrentHitSet (Step 614) and the procedure proceeds to Step 616. If it is determined that Inst1 is not associated with the memory leak characteristic at Step 612, then the procedure jumps to Step 616. At Step 616, it is judged whether Worklist and CurrentHitSet are all Null while Indicator is 0. When (i) Worklist is not Null and Indicator is 1, or (ii) when Worklist is not Null, Indicator is 0 and CurrentHitSet is not Null, the procedure proceeds to Step 608 to continue to read the next instruction pair. Otherwise, the procedure proceeds to Step 617 where Indicator is reset at 0.

Next, at Step 618, local variables in CurrentHitSet are removed and only the instructions which perfectly match the memory leak characteristic obtained by dynamic analysis remain. Then, CurrentHitSet and CallerHitSet are merged, i.e. CallerHitSet=CallerHitSet+CurrentHitSet. At this time, CallerHitSet stores the memory leak variables or instructions obtained by this analysis method. Then, at Step 620, the entire of Class file is last-visited to locate last used variables or objects resulting in the memory leak. The located memory leak is reflected to Java source code via mapping between the Java Class file and the Java source code. Then, the code corresponding to memory leak location of Class file is located in the Java source code. At Step 622, the correct code may be provided to the user, or the code corresponding to memory leak location may be repaired automatically.

Next, the repaired program is dynamically analyzed (Step 624). If the memory leak amount of the repaired program is determined to be smaller than the threshold THD preset by the user (Step 626), then the analysis ends. Otherwise, the procedure jumps to Step 608, i.e. returns back to static analysis procedure, to continue locating a new memory leak item until the items whose memory leak amounts in total exceed the threshold THD have been removed.

The embodiments shown in FIGS. 5 and 6 balance memory leak analysis overhead and accuracy as needed so as to optimize the performance of the whole memory leak analysis. Of course, those skilled in the art will appreciate that the embodiment shown in FIG. 6 is only illustrative. The static analysis may be performed with regard to a portion of the program or a branch of the program.

Figure 7:
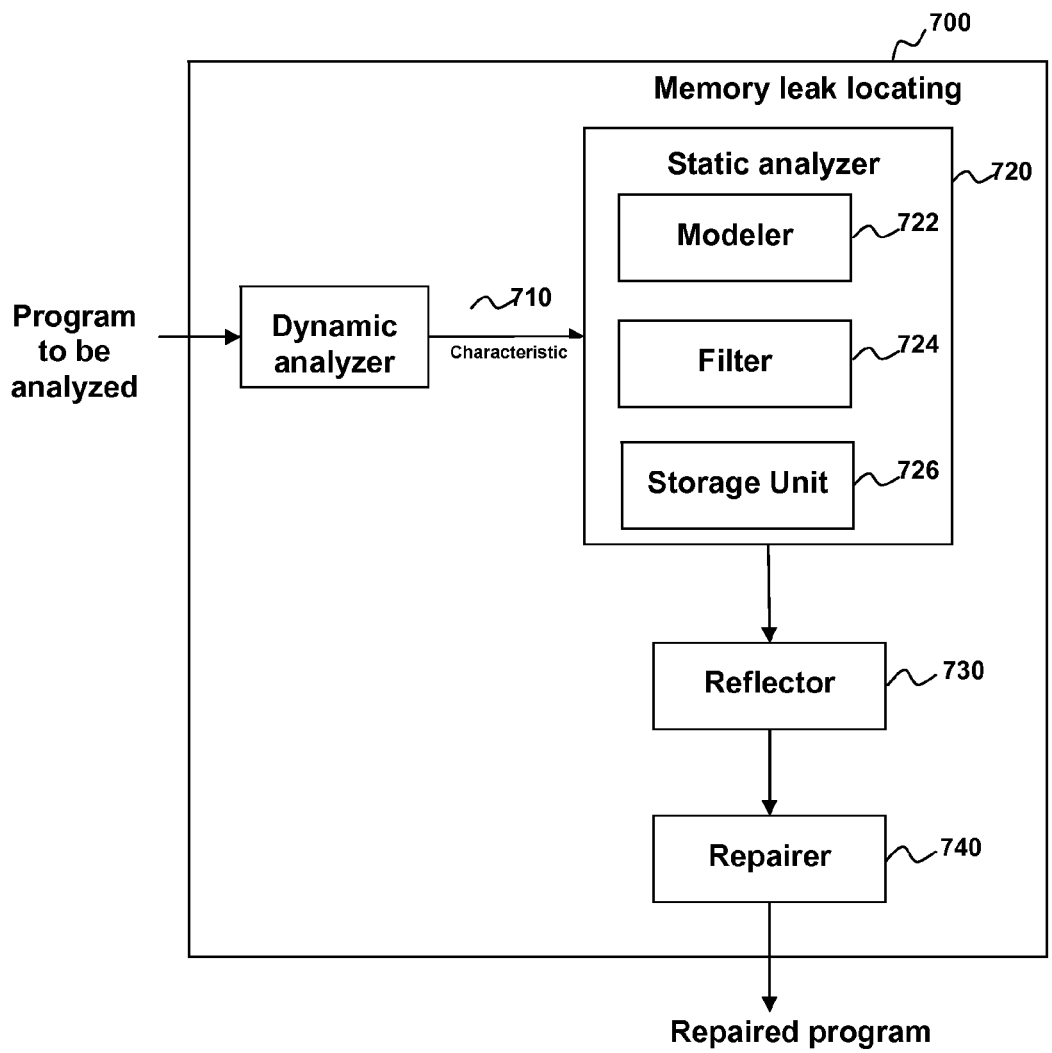
FIG. 7 is a schematic view showing a memory leak locating apparatus according to a preferred embodiment of the present invention.

FIG. 7 is a schematic view showing a memory leak locating apparatus 700 according to a preferred embodiment of the present invention. The memory leak locating apparatus 700 includes dynamic analyzer 710, static analyzer 720, source code reflector 730, and code repairer 740. The static analyzer 720 includes a modeler 722, filter 724, and storage unit 726.

A user inputs a Java Class file to be analyzed to the memory leak locating apparatus 700. The dynamic analyzer 710 dynamically analyzes the input Class file to determine memory leak characteristic(s). Then, the determined memory leak characteristic(s) and input program are transmitted to the static analyzer 720 together. In the static analyzer 720, the input program is modeled by the modeler 722. Then, the filter 724 filters the built program model by use of the memory leak characteristic(s) input from the dynamic analyzer 710. The statements matching memory leak characteristic are stored into the storage unit 726. After all statements of the program model are analyzed, the source code reflector 730 reflects statements resulting in a memory leak stored in the storage unit to the Java source code by means of the mapping between the Java Class file and the Java source code. At last, the code repairer 740 repairs the located source code resulting in the memory leak of the source code.

It is should be noted that the memory leak locating apparatus shown in FIG. 7 is only illustrative. Those skilled in the art may contemplate a memory leak locating apparatus which includes modules of functioning steps shown in FIGS. 3-6 when reading the description of FIGS. 3-6.

It is should also be understood that the steps of the methods of the present invention are to be implemented using one or more computer devices to advantageously locate a memory leak in a program. Thus, a person of ordinary skill in the art would know how to configure the one or more computer devices to carry out the steps of the method of the present invention.

The foregoing description of all aspects of the present invention is given for the purpose of illustration and explanation. It is not intended to exhaustively describe or limit the present invention to the disclosed precise forms. For example, any other suitable combination of steps or modules shown in the above embodiments is possible. In addition, the method and apparatus for locating memory leak of the present invention may be applied to C/C++ source programs though the method and apparatus of the present invention are described in a Java program example. Therefore, it should be comprehended that the present invention is not limited to the disclosed specific embodiments but is intended to cover all possible modifications and variations defined by the appended claims.

What is claimed is:

1. A method for locating a memory leak in a program by a computer device, the method comprising the steps of:

dynamically analyzing the program by the computer device to determine a memory leak characteristic, wherein dynamically analyzing the program comprising:

obtaining a plurality of candidate memory leak characteristics, sorting the obtained plurality of memory leak characteristics in terms of memory leak amount, selecting, as the determined memory leak characteristic, a candidate memory leak characteristic having a maximum memory leak amount when the maximum memory leak amount exceeds a predetermined threshold, and selecting, as a plurality of the determined memory leak characteristics, the candidate memory leak characteristics whose leak amounts in total exceed the predetermined threshold when the maximum memory leak amount does not exceed the predetermined threshold;

examining each instruction and filtering out items which do not match the determined memory leak characteristic of the program by the computer device in order to determine a static analysis range containing certain suspicious parts that can cause a memory leak; and statically analyzing the suspicious parts of the determined static analysis range of the program by the computer device to locate the memory leak in the program;

pausing the step of statically analyzing if an item that matches the memory leak characteristics is located;

reflecting the located memory leak to the source code of the program;

repairing the source code of the program to get a repaired program;

dynamically analyzing the repaired program; and statically analyzing the repaired program to determine if a memory leak amount of the repaired program is less than a predetermined threshold.

2. The method according to claim 1, wherein the step of dynamically analyzing the program is carried out by the steps of:

obtaining a plurality of candidate memory leak characteristics; and selecting a candidate memory leak characteristic with an optimum analysis rate and an optimum analysis accuracy from among the plurality of candidate memory leak characteristics as the determined memory leak characteristic.

3. The method according to claim 1, wherein the step of statically analyzing the program is carried out by the steps of:

storing global memory leak related information;

storing memory leak related information of a method under analysis;

retrieving a static analysis record of an invoked method based on the method being invoked;

judging whether to statically analyze the invoked method in a predetermined rule; and updating the static analysis record of the invoked method based on a result of the judging.

4. The method according to claim 3, wherein the static analysis record includes a memory leak analysis time, an information on presence or absence of memory leak items, and an information on whether memory leak items have been removed.

5. The method according to claim 3, wherein the predetermined rule involves at least one of: an elapsed time since last-time memory leak analysis, an information on whether previously located memory leak items have been removed, and a relevance of the previously located memory leak to the memory leak characteristics currently obtained by the step of dynamic analysis.

6. The method according to claim 1, further comprising the steps of:

reflecting the located memory leak to the source code of the program; and repairing items corresponding to the located memory leak in the source code.

7. A method for locating a memory leak in a program by a computer device, the method comprising the steps of:

dividing the program by the computer device into a plurality of segments;

selecting by the computer device a dynamic analysis method for each of the plurality of segments;

dynamically analyzing by the computer device each of the plurality segments using the selected dynamic analysis method, wherein dynamically analyzing each of the plurality segments comprising:

obtaining a plurality of candidate memory leak characteristics, sorting the obtained plurality of memory leak characteristics in terms of memory leak amount, selecting, as the determined memory leak characteristic, a candidate memory leak characteristic having a maximum memory leak amount when the maximum memory leak amount exceeds a predetermined threshold, and selecting, as a plurality of the determined memory leak characteristics, the candidate memory leak characteristics whose leak amounts in total exceed the predetermined threshold when the maximum memory leak amount does not exceed the predetermined threshold;

dermining a memory leak characteristic for each of the plurality segments by filtering out items which do not match the determined leak characteristic for the corresponding segment to determine a static analysis of the corresponding segment containing certain suspicious parts that may possibly cause a memory leak;

statically analyzing the determined static analysis range of each of the plurality segments by a computer device based on the determined corresponding memory leak characteristic to locate a memory leak in each of the plurality segments;

pausing the step of statically analyzing if an item that matches the memory leak characteristics is located;

reflecting the located memory leak to the source code of each of the plurality segments;

repairing the source code of the program to get a repaired program;

dynamically analyzing the repaired program; and statically analyzing the repaired program to determine if a memory leak amount of the repaired program is less than a predetermined threshold.

8. An apparatus for locating a memory leak in a program, comprising:

a computer device configured to run the computer program and further having a dynamic analyzer to dynamically analyze the computer program to determine memory leak characteristics, wherein the dynamic analyzer provides a plurality of candidate memory leak characteristics, the dynamic analyzer comprising:

a sorter configured to sort the plurality of memory leak characteristics in terms of memory leak amount;

a comparator configured to compare a maximum memory leak amount with a predetermined threshold; and a memory leak characteristic selector configured to select as the memory leak characteristic (i) a candidate memory leak characteristic having a maximum memory leak amount when the maximum memory leak amount exceeds a predetermined threshold and (ii) candidate memory leak characteristics whose leak amounts in total exceed the predetermined threshold when the maximum memory leak amount does not exceed the predetermined threshold;

said computer device also having a static analyzer configured to filter out items which do not match the determined memory leak characteristic of the computer program in order to determine a static analysis range of the source code of the program containing certain suspicious parts that may possibly cause a memory leak and statically analyze the suspicious parts of the determined static analysis range of the computer program to locate the memory leak in the computer program, wherein the static analyzer is configured to pause the step of static analysis if an item that matches the memory leak characteristics is located, reflect the located memory leak to the source code of the computer program, repair the source code of the computer program to get a repaired program, dynamically analyze the repaired program, and statistically analyze the repaired program to determine if a memory leak amount of the repaired program is less than a predetermined threshold.

9. The apparatus according to claim 8, wherein the static analyzer comprises:
   a storage unit configured to store a static analysis record of various invoked processes, the storage unit also enabled to store global memory leak related information and memory leak related information of a method under analysis;
   a retriever configured to retrieve the static analysis record of a invoked process from the storage unit;
   a judger configured to judge whether to statically analyze the invoked process in a predetermined rule based on the previous static analysis record retrieved by the retriever; and
   an updater configured to update the static analysis record of the invoked process in the storage unit.

10. The apparatus according to claim 9, wherein the static analysis record includes a memory leak analysis time, an information on presence or absence of memory leak items, and an information on whether memory leak items have been removed.

11. The apparatus according to claim 9, wherein the predetermined rule involves at least one of: an elapsed time since last-time memory leak analysis, an information on whether previously located memory leak items have been removed, and a relevance of the previously located memory leak to the memory leak characteristics currently obtained by the step of dynamic analysis.

12. The apparatus according to claim 8, further comprising:
   a reflector configured to reflect the located memory leak to the source code of the program; and
   a repairer configured to repair items corresponding to the located memory leak in the source code.

* * * * *